(12) United States Patent
Yamada

(10) Patent No.: US 8,388,875 B2
(45) Date of Patent: Mar. 5, 2013

(54) MOLD GOODS AND INSERT MOLDING METHOD

(75) Inventor: Shuji Yamada, Fuji (JP)

(73) Assignee: Nihon Plast Co., Ltd., Fuji-Shi (JP)

( * ) Notice: Subject to any disclaimer, the term of this patent is extended or adjusted under 35 U.S.C. 154(b) by 349 days.

(21) Appl. No.: 11/645,579

(22) Filed: Dec. 27, 2006

(65) Prior Publication Data

US 2007/0148411 A1 Jun. 28, 2007

(30) Foreign Application Priority Data

Dec. 28, 2005 (JP) ................................. 2005-377471

(51) Int. Cl.
*B29C 67/00* (2006.01)

(52) U.S. Cl. ............. 264/46.4; 264/45.2; 264/45.5; 264/45.6; 264/46.5; 264/240; 264/241; 264/264; 264/263; 264/328.8; 264/510; 264/260

(58) Field of Classification Search .............. 264/46.4, 264/45.2, 45.5, 45.6, 46.5, 240, 241, 261, 264/263, 328.8, 37.27, 37.33, 645, 510, 513, 264/516, 537, 297.2, 297.4, 328.1, 35, 45.1, 264/45.4, 247, 255, 259, 260, 271.1, 275, 264/279, 279.1

See application file for complete search history.

(56) References Cited

U.S. PATENT DOCUMENTS

| | | | | |
|---|---|---|---|---|
| 4,412,072 A | * | 10/1983 | Kamatani et al. | 544/68 |
| 5,662,996 A | * | 9/1997 | Jourquin et al. | 428/318.8 |
| 2005/0218555 A1 | * | 10/2005 | De Winter et al. | 264/219 |
| 2006/0029751 A1 | * | 2/2006 | Cowelchuk et al. | 428/31 |

FOREIGN PATENT DOCUMENTS

| | | |
|---|---|---|
| JP | S58-101044 A | 6/1983 |
| JP | H05-057735 A | 3/1993 |
| JP | H05-329862 | 12/1993 |
| JP | H09-052305 A | 2/1997 |
| JP | 09-183138 | 7/1997 |
| JP | H09-183826 A | 7/1997 |
| JP | 2002-527263 | 8/2002 |
| JP | 3358416 | 10/2002 |
| JP | 2004-058564 | 2/2004 |
| JP | 2005-104319 | 4/2005 |
| WO | WO 00/23239 | 4/2000 |

OTHER PUBLICATIONS

Japanese Office Action issued on Mar. 22, 2011 in the corresponding Japanese Patent Application No. 2005-377471.

* cited by examiner

*Primary Examiner* — Jeffrey Wollschlager
*Assistant Examiner* — Stella Yi
(74) *Attorney, Agent, or Firm* — NDQ&M Watchstone LLP (57) ABSTRACT

For a skin, a non-formed polyurethane resin layer at the surface side and a foamed polyurethane resin layer between the non-foamed polyurethane resin layer and a base member are configured to form an integral and uniform layer over and extent from an injection point to a distant point on a surface of the base member, so that an integral skin foam in which such skin layer and foamed layer are laminated can be molded, under an atmospheric pressure, in a single process, allowing for manufacture of a laminate article with a high degree of uniformity over an appreciable wide range of the article, as well as for provision of a laminate mold goods having the skin and foamed layers formed with a high uniformity along the base member, over the length in a flow direction of skin forming material.

19 Claims, 6 Drawing Sheets

MOLD GOODS AND INSERT MOLDING METHOD

BACKGROUND OF THE INVENTION

The present invention relates to a mold goods having a laminated flexible resin skin formed in a desirable location of the mold goods with an appreciable size, and an insert molding method suitable for manufacture of the mold goods.

As a conventional mold goods in which a skin lined with a foamed layer is attached on a base member such as a resin panel, a typical one is manufactured by a method in which a skin layer to be located at an outermost side of the product is premolded by a slash molding as well as a spray skin method or a vacuum molding method, and after this is inserted together with the base member, a polyurethane resin is injected and foamed as for a cushion layer between the skin layer and the base member.

As another well-known method, there is one that has begun to be employed, in which a sheet composed of a vinyl chloride or thermoplastic elastomer sheet (such as of an olefin system or urethane system, sometimes referred to as "TPO" or "TPU", respectively) is lined in advance with a foaming layer made of a polyethylene foam (sometimes referred to as "PEF") to provide a laminate sheet, which is absorbed for formation in a preheated female form, thereby being premolded in correspondence to the base member, and is attached by an adhesive or the like or inserted into an injection mold, to be insert-molded integrally with the base member.

For the protection of a cushion layer to have a secured durability against surface wear or such of products, the skin layer is unavoidable to interior parts of automobile that are required to stand the use in by far severe circumstances.

It also is important to provide an attachment strength between skin layer and cushion layer, and in the case of mold goods having application to the interior parts of automobile to be usually touched by hand or gripped for operation, the attachment strength (adhesion strength) between those layers, as well as their attachment strength to the base member, should be sufficient in level.

Japanese Patent Application Publication No. 2002-527263 has disclosed and example of conventional manufacturing method. In this document, disclosed technique needs two steps of molding process for molding a laminate of foamed layer and skin layer, and is troublesome, inefficient in productivity, and impractical.

Moreover, as a manufacturing method of a double-color mold goods by polyurethane resin material having an internal layer and thin skin layers, such a method is known that in a pressure-reduced form, a skin material is injected and attached on an inside of the form, and then a material for the internal layer is injected (for example, refer to Japanese Patent No. 3358416). This however needs a dedicated facility for pressure reduction of the cavity, and a mold to be high of air-tightness, besides a required time for pressure reduction to a prescribed pressure, and is very troublesome and costs high, so that one would have to say the employment is difficult.

Further, a combination of foamed layer and non-foamed skin layer of polyurethane is molded by a sequence of processes in a method, which also is known by Japanese Patent Application Laying-Open Publication No. 2004-58564 the covers and application by the present applicant. This method might be yet insufficient, as an increased uniformity is required between foamed layer and skin layer.

In particular, for such a large-scale mold goods as an upper facia of instrument panel, it is difficult to give an even tactile impression in a vicinity of an injection point (gate) and at a location distant therefrom, such that due to the non-foamed layer being thick at locations vicinal to the injection point and extremely thinned in thickness at location distant from the injection, the vicinity of the injection point has a firm touch while the location distant therefrom gives a very soft feel. The flow of polyurethane resin forming a skin layer may not arrive at locations further distant from the injection point, thus failing to have a skin layer spread over an entire product surface, with a resultant exposure of foamed layer in some cases, constituting a difficulty in applications to panel-like large-scale components or such.

SUMMARY OF THE INVENTION

It is an object of the present invention to provide a manufacturing method, as a method that can mold an integral skin foam in which a foamed layer and a skin layer are laminated, under a normal pressure (atmospheric pressure), in a single process, allowing a laminate article to be obtained in which a mold goods manufactured by this molding method has a high degree of uniformity over an appreciable wide range of the article. Further, it is an object of the invention to provide a laminate mold goods in which the foamed layer and skin layer have a high uniformity along a base member, over a prescribed length in a flow direction of a skin forming material.

After keen examination, the present inventor has learned controlling the viscosity of a polyurethane resin injected for formation of a skin layer in a mold form and the injection or foaming characteristic of a polyurethane resin for formation of a foamed layer, to be important for enhancement of uniformity of those two layers, and made the invention.

According to the first aspect of the invention, in a mold goods having a flexible skin integrally molded along a surface of a base member, the mold goods comprises a skin having a combination of a non-foamed polyurethane resin layer at a side of a surface thereof, and a foamed polyurethane resin layer between the non-foamed polyurethane resin layer and a base member, configured to form an integral and uniform layer over and extent from an injection point to a distant prescribed point on a surface of the base member.

According to a second aspect of the invention, in the mold goods according to the first aspect, the mold goods is a cover panel for an air bag apparatus, and the extent of the distant prescribed point in which the integral and uniform layer is formed has formed therein a swelling opening presumptive portion configured to form an opening with a pressure of an air bag deployed in opposition to a passenger.

According to a third aspect of the invention, in a mold goods having a flexible skin integrally molded along a surface of a base member, the mold goods comprises a skin having a combination of a first non-foamed polyurethane resin layer at a side of surface thereof, a second non-foamed polyurethane resin layer at a side of a base member, and a foamed polyurethane resin layer between the first non-foamed polyurethane resin layer and the second non-foamed polyurethane resin layer, configured to form an integral and uniform layer over an extent from an injection point to a distant prescribed point on a surface of the base member.

According to a fourth aspect of the invention, in the mold goods according to the third aspect, the mold goods is a cover panel for an air bag apparatus, and the extent of the distant prescribed point in which the integral and uniform layer is formed has formed therein a swelling opening presumptive portion configured to form an opening with a pressure of an air bag deployed in opposition to a passenger.

According to a fifth aspect of the invention, in the mold goods according to the fourth aspect, the cover panel is a cover an instrument panel, and has a proximal side proximal to a passenger, and a passenger-opposite side distant from the passenger, and the integral and uniform layer is formed at the proximal side.

According to a sixth aspect of the invention, in the mold goods according to the third aspect, the mold goods is a grip member having a grip portion to be gripped by a passenger and a fixing portion for the grip portion to be fixed to a vehicle body, and the skin has, covering a base member grip portion and a base part of a base member fixing portion at an end of the base member grip portion, an integral and uniform grip layer formed between a point of the grip potion and another point of the grip portion distant therefrom.

According to a seventh aspect of the invention, in an insert molding method comprising placing a base member in a mold cavity, and performing an injection of a reaction-molding material of a non-foaming polyurethane resin and a reaction-molding material of a foaming polyurethane resin, along a surface side of the base member, under a normal pressure, to integrally form a skin, the reaction-molding material of the foaming polyurethane resin contains a first foaming agent for a start of foaming soon after the injection, and a second foaming agent for a start of foaming in retard of the start of foaming of the first foaming agent, and the skin has integral and uniform layer formed along a surface of the base member from an injection point of the reaction-molding materials to a point distant therefrom.

According to an eight aspect of the invention, in the insert molding method according to the seventh aspect, the reaction-molding material of the foaming polyurethane resin and the reaction-molding material of the non-foaming polyurethane resin having a viscosity within a range of 400 cps to 700 cps are concurrently flowed inside the mold cavity under an atmospheric pressure, whereby the reaction-molding materials are filled in the mold cavity concurrently upon a substantial completion of foaming.

According to a ninth aspect of the invention, in an insert molding method comprising placing a base member in a mold cavity, performing an injection of a reaction-molding material of a non-foaming polyurethane resin along a surface side of the base member under a normal pressure, and performing an injection of a reaction-molding material of a foaming polyurethane resin immediately after the injection of the reaction-molding material of the non-foaming polyurethane resin, to integrally form a skin, the reaction-molding material of the foaming polyurethane resin comprises a first reaction-molding material selective from between a reaction-molding material having a dissolved non-gaseous foaming agent (i.e. except for gaseous foaming agents) and a reaction-molding material containing a first foaming agent for a start of foaming immediately after injection, and another reaction-molding material containing a second foaming agent for a start of foaming after the start of foaming of the first reaction-molding material, and the skin has an integral and uniform layer formed along a surface of the base member from an injection point of the reaction-molding materials of both the non-foaming polyurethane resin and the foaming polyurethane resin to a point distant therefrom.

According to a tenth aspect of the invention, in the insert molding method according to the ninth aspect, the reaction-molding material of the foaming polyurethane resin and the reaction-molding material of the non-foaming polyurethane resin having a viscosity within a range of 400 cps to 700 cps are concurrently flowed inside the mold cavity under an atmospheric pressure, whereby the reaction-molding materials are filled in the mold cavity concurrently upon a substantial completion of foaming.

BRIEF DESCRIPTION OF THE DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below the preferred embodiments of the present invention with reference to the accompanying drawings. Like members are designated by like reference characters.

It is first noted that in manufacturing methods according to embodiments of the invention, the viscosity of a reacting injection-molding material 3 of non-foaming polyurethane resin is important.

In embodiments of the invention, a base member 2 has formed thereon a uniform laminate of a double-layer structure composed of a non-foamed polyurethane resin layer and a foamed polyurethane resin layer, as well as of a triple-layer structure (as a layered structure of non-foamed polyurethane resin thin-films with an intermediate foamed polyurethane resin cushion layer sandwiched in between), for which the viscosity of a non-foaming polyurethane resin material 3 injected in a cavity C is controlled to be set within a prescribed viscosity range when a foaming polyurethane resin material 4 is injected, as this is important.

If the viscosity of the non-foaming polyurethane resin material 3 is excessively low for formation of a skin layer or of a top layer and a bottom layer, this non-foaming polyurethane resin material 3 may be mixed with the foaming polyurethane resin material 4 in the cavity C, with an unsuccessful result in formation of a desirable laminate structure.

Or it may result in a rupture of the skin layer or top layer (sometimes collectively referred to as "skin layer") due to foaming, causing an exposure of the foamed layer. To the contrary, if the viscosity of the non-foaming polyurethane resin material 3 is excessively high for formation of the skin layer, the non-foaming polyurethane resin material may be different in thickness and the like between a vicinity of a gate G and distal ends of flow, or may have big voids generated in the foamed layer, resulting in a reduced uniformity of layer structure.

Further, in embodiments of the invention, in addition to the control of viscosity, it also is important to control the duration of foaming to be contained during a specific viscosity change of the skin layer forming material 3. In embodiments of the invention, the foaming should be continued until the skin layer forming material 3 has an increased viscosity of (viscosity rise to) about 800 cps. If the foaming is finished while the viscosity is insufficiently increased, then a covering film of the skin layer forming material 3 may be broken with ease at distal ends of flow, causing problems such as an exposure of a layer foamed therein, with a resultant limitation of applicable article to a relatively small size.

Accordingly, in embodiments of the invention, it is important for the non-foaming polyurethane resin material 3 injected into the cavity C under a normal pressure to advance its reaction a little to have an increased viscosity within a range of 400 cps to 700 cps, preferably within a range of 600 cps to 700 cps, more preferably within a range of 650 cps to 700 cps, when the foaming polyurethane resin material 4 is injected. Immediately after injection of this resin material 4, by its foaming, typically, the apparent viscosity is reduced. At this time, the foaming polyurethane resin material 4 may preferably have a viscosity within a range of 100 cps to 400 cps.

If the foaming polyurethane resin material 4 is injected by such a timing, this resin material has a desirable layer-like separated state held, while foaming and running in the cavity C, till it arrives at a prescribed distance. The foaming is continued while the viscosity of the non-foaming polyurethane resin material 3 for formation of skin layer increases up to a viscosity range of 800 cps to 1,000 cps, and is substantially finished within the above-noted viscosity range. If the foaming be still maintained after the viscosity of the non-foaming polyurethane resin material has exceeded the above-noted viscosity range, the foamed layer might have voids generated therein, resulting in a reduced layer uniformity.

The skin of a laminate mold goods thus formed can have a high layer uniformity both in a vicinity of the gate G and at locations remarkably distant therefrom. This uniformity allows the appearance and tactile impression of the laminate mold goods to be as they are expected, as well as the cleavability of an instrument panel having an incorporated airbag function.

A laminate mold goods can thus be obtained, in which a foamed layer is free of internal voids, and formed uniform over an appreciable wide range, while also the thickness of the foamed layer as well as of a non-foamed layer is uniform. For example, the flow can be spread 500 mm or more from the gate G forming a uniform layer over a distance of about 800 mm.

In embodiments of the invention, basically, the material 3 to be employed for formation of a non-foamed polyurethane resin layer may be a general reacting injection-molding material, providing that the above-noted viscosity condition can be met by an adjustment such as of catalyst or cross-linker.

This is like to the material 4 to be employed for formation of a foamed polyurethane resin layer in embodiments of the invention. The foaming agent to be employed in embodiments of the invention has no particular limitations imposed thereon so long as it allows the above-noted foaming condition to be met in the cavity C, and may be used in combination with a gas, such as carbon dioxide, nitrogen, or air, or in combination with such a gas and a chemical foaming agent. The chemical foaming agent may be an acid (such as formic acid), water, etc. Further, a thermal evaporation foaming agent such as chlorofluorocarbon or pentane may be used. As a by far preferable foaming agent for the handling of mold goods, a combination of formic acid and carbon dioxide may be taken.

In embodiments of the invention, an insert molding method employs a polyurethane resin material 3 for formation of a skin layer and a polyurethane resin material 4 for formation of an intermediate foamed layer, which contain prescribed proportions of polyol as a first component and polyisocyanate as a second component, and may have their combinations of polyol and polyisocyanate, mutually identical or different.

In the case of identical combinations: first and second material supply lines for respective supply of polyol and polyisocyanate (to be mutually combined for formation of skin layer, for example,) are connected to a mixing head for material injection; and a third material supply line for supply of a material composed of an adequate third component mixed with a foaming agent as a fourth component, and a fourth material supply line for supply of a material composed simply of the third component mixed with no foaming agents are selectively connected to the mixing head, via a necessary number of select valves for selective connection of each of the third and fourth material supply lines to either of the first and second material supply lines, whereby either a material 3 composed of the first to third components (containing no foaming materials) or a material 4 composed of the first to fourth components (containing the foaming material) is injected from the head into the cavity C.

The material to be injected for the first time for skin formation does not contain the foaming agent. After injection into the cavity C, this material has an increased viscosity within a prescribed viscosity range, with a lapse of time, which is detected, and by this timing the select valves are switched to have the foaming agent contained this time, so that a polyurethane resin material for formation of an intermediate foamed layer is injected through the mixing head into the cavity C.

Such the material supply system may be substituted by a combination of: a first material supply system (for example, S1 in FIG. 3) in which first and second material supply lines (for example, L1 and L2 in FIG. 3) for respective supply of polyol and polyisocyanate, and a third material supply line (for example, L3 in FIG. 3) for supply of a material composed of an adequate third component mixed with a foaming agent as a fourth component are connected to a first mixing head (for example, H1 in FIG. 3) for material injection; and a second material supply system (for example, S2 in FIG. 3) in which a fourth material supply line (for example, L4 in FIG. 3) for supply of a material composed simply of the third component mixed with no foaming agents, and fifth and sixth material supply lines (for example, L5 and L6 in FIG. 3), or a combination of changeover valves and branches of the first and the second material supply lines, for respective supply of polyol and polyisocyanate are connected to a second mixing head (for example, H2 in FIG. 3) for material injection, whereby two flows of materials 3, 4 can be injected into the cavity C from two supply systems independent from each other, wholly (or in part).

It is noted that in this combination of supply systems, the first material supply system (for example, S1 in FIG. 3) is adapted to supply a polyurethane resin material 4 for formation of a foamed or internal layer, and the second material supply system (for example, S2 in FIG. 3) is adapted to supply a polyurethane resin material 3 for formation of a non-foamed or skin layer.

In this case, materials 3, 4 from two systems can be concurrently supplied to the cavity C. However, for a facilitated operational setting of the facility, it is recommendable to first start, like the former system, injecting a material 3 for formation of a skin layer into the cavity C, from the mixing head of the second supply system with no foaming agents mixed, while having the reaction advance, and after the viscosity is increased within a prescribed range, enter an injection of a material 4 for formation of a foamed layer from the mixing head of the first supply system.

In this respect, before injection of material (3, 4), the viscosity is relatively low, and equipment for the mixing, transfer, etc, can do with relatively small capacities, and with minor difficulties such as for quantitation to be accurate for injection. However, when it comes to a high-viscous fluid, the circumstances are different, selection for adaptation being required of equipment for the handling, as well, considerations to unstable factors being unavoidable for a mass production to be stable, and accompanied by disadvantages and difficulties in cost and technology.

In the case of different combinations, that is, when the combination of resin materials for a material 3 for formation of a skin layer is different from that of resin materials for a material 4 for formation of a foamed layer, the first and second supply systems may well be separately used for supply of the material 3 for skin layer formation and for supply of the material 4 for foamed layer formation, respectively. In this case, if the material 3 for skin layer formation is required to cover a thickness direction of end part of the gate G side, as well, only the material 3 may be injected by a small quantity at the final by arranging motion sequences of facility.

Figure 3:
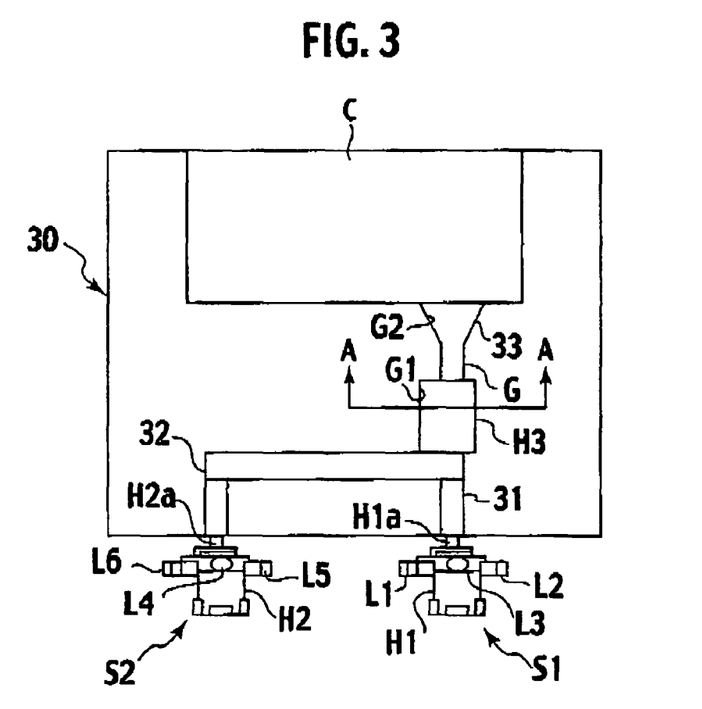
FIG. 3 is an illustration about a gate of a mold to be employed for concurrent injection of a skin layer forming resin material and an intermediate foamed layer forming resin material to a cavity.
Figure 4A:
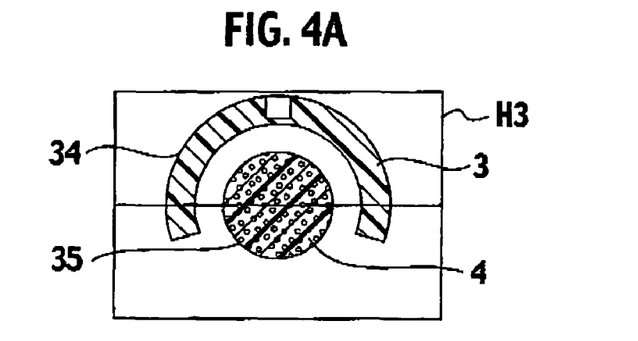
FIG. 4A illustrates a coaxial gate as a section along line A-A of FIG. 3, and FIG. 4B, a laminate structure of a mold goods obtained.
Figure 5A:
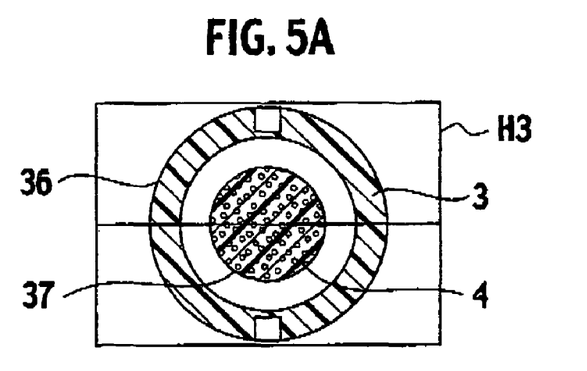
FIG. 5A illustrates another coaxial gate as a section along line A-A of FIG. 3, and FIG. 5B, a laminate structure of a mold goods obtained.
Figure 8A:
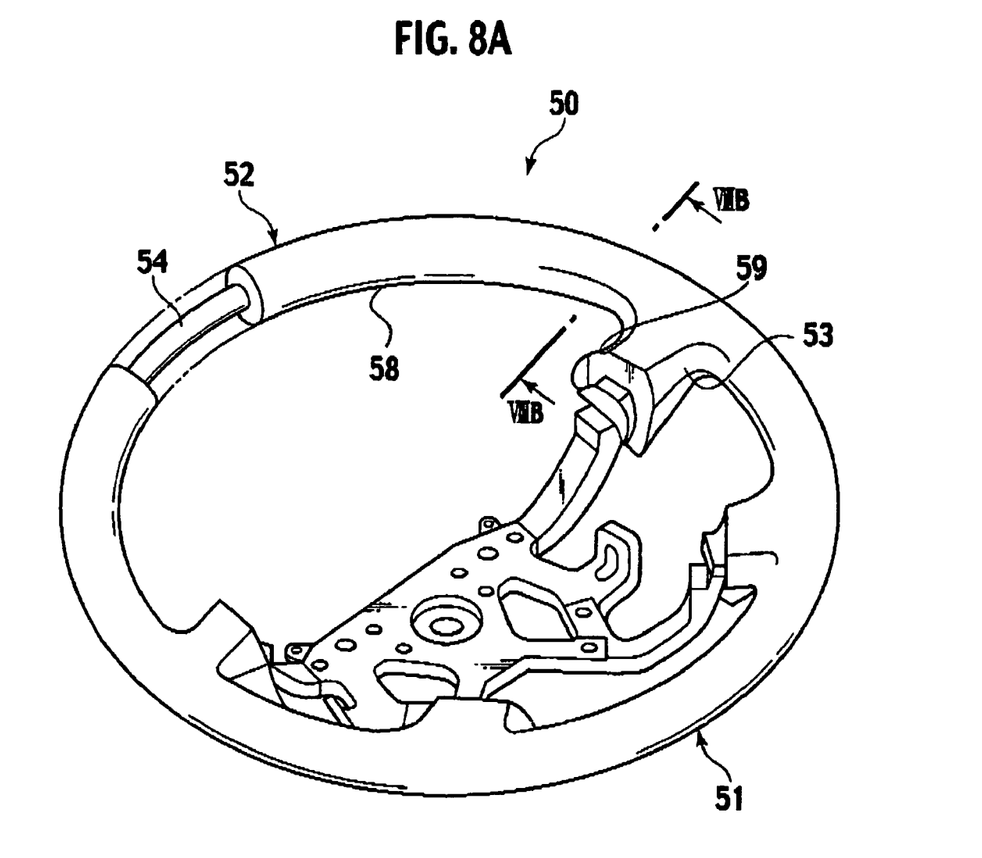
FIG. 8A illustrates an embodiment of a steering wheel, and FIG. 8B, a section along line VIIIB-VIIIB of FIG. 8A.
Figure 8B:
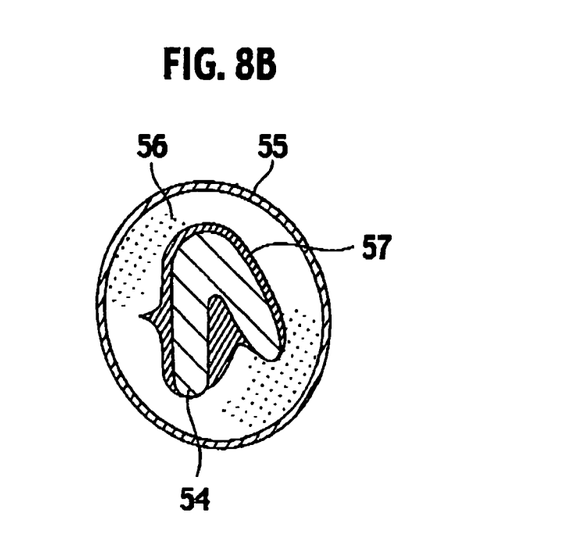

For concurrent injection of a material 3 for formation of a skin layer and a material 4 for formation of a foamed layer into the cavity C (in particular, in the case in which the mold goods has a section in the form of a circle or sector or a variety of deformation thereof, as illustrated in FIG. 8, or more specifically, like a ring portion 58 or a spoke portion 59 crossing the ring portion 58 of a steering wheel 50), preferably, as illustrated in FIG. 3, a mold 30 (shown by a rectangular outline in the figure) that defines the cavity C should be configured with a first runner 31 (shown in an I shape for example) communicating with an outlet H1*a* for delivery of the first mixing head H1 of the first supply system S1 (shown below the mold 30, at the right), a second runner 32 (shown in an invert L shape for example) communicating with an outlet H2*a* for delivery of the second mixing head H2 of the second supply system S2 (shown below the mold 30, at the left), and a gate G of which a lower portion G1 has fit therein airtight an injection head H3 formed with paths (or nozzles) 34, 35 or 36, 37 communicating with the first and second runners 31, 32 in a fashion illustrated in FIG. 4A or FIG. 5A, an upper portion G2 of the gate G defining a diverged or funnel-shaped third runner 33 communicating with the above-noted paths (or nozzles) 34, 35 or 36, 37 of the injection head H3 and the cavity C.

As illustrated in FIG. 4A or 5A, this injection head H3 is configured with a radially outer axial path (or nozzle) 34 or 36 extending coaxially for delivery of the material 3 for skin layer formation, and a radially inner of central path (or nozzle) 35 or 37 extending along the axis for delivery of the material 4 for foamed layer formation (this head H3 being sometimes referred to as "coaxial head").

Figure 4B:
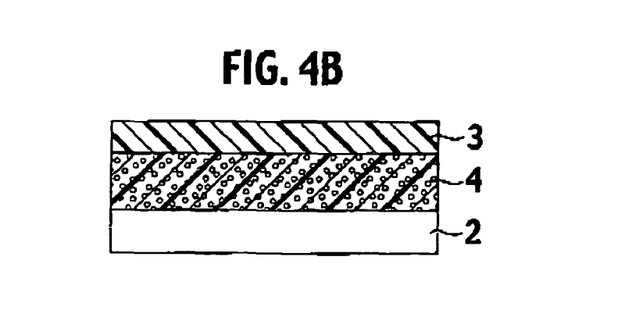
Figure 5B:
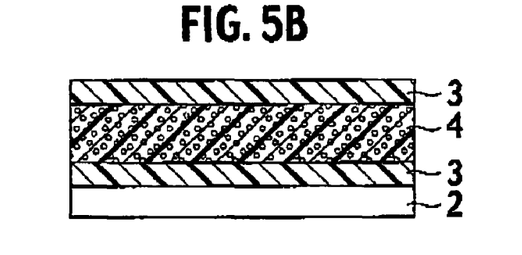

In the coaxial head H3, the resin material 3 for skin layer formation is supplied from the second runner 32 to the outer path 34, 36, where it axially flows, coaxially enclosing the resin material 4 for foamed layer formation, as this 4 is supplied from the first runner 31 to the inner path 35, 37. FIG. 4A illustrates a sectional structure of coaxial head H3 that has an arc-shaped outer path 34 about the inner path 35, and FIG. 5A, a sectional structure of coaxial head H3 that has a circular outer path 36 about the inner path 37. The structure of FIG. 4A is suitable for molding a laminate having a base member 2, a foamed layer laminated on the base member 2, and a top skin layer laminated on the foamed layer, as illustrated in FIG. 4B. The structure of FIG. 5A is suitable for molding a laminate having a base member 2, a bottom skin layer laminated on the base member 2, a foamed layer laminated on the bottom skin layer, and a top skin layer laminated on the foamed layer, as illustrated in FIG. 5B.

For the concurrent injection into cavity C by use of coaxial head H3, the resin material 3 for formation of an outer skin layer should have a viscosity adjusted in advance within a prescribed viscosity range. For the viscosity adjustment, the kind of polyol to be employed may be selected, and a thickening agent or gum may be added. Also the required time for viscosity increase may be set desirable, by adjusting kinds of cross-linker or catalyst, as well as their quantities. The shorter the viscosity rise time is, the shorter that interval of time becomes, in which the urethane material can flow within the cavity C.

It thus becomes difficult to obtain a product with a large area, and hence the viscosity rise time is set in dependence on a size of the product. However, if the viscosity rise time over-extended, the polyurethane resin for skin layer formation might have an elongated cure time, rendering the mold shot time unnecessarily extended, with a worsen productivity, which should be avoided. Further, two resin materials being non-foaming polyurethane and foaming polyurethane contact each other in fluidized state for an extended time, where the foaming agent may be transferred to the skin layer side, with an undesirable tendency to render unclear the boundary between the neighboring two layers. There might be a possible reduction in real thickness of the skin layer or influence on the surface appearance, with potential anxieties such as about a reduced foam of the foamed layer causing a reduced cushioning property and a reduced uniformity of foam.

To this point, preferably, the material for skin layer formation should have a viscosity characteristic in which the viscosity rises within a time interval between 5 to 15 seconds after the injection, up to a range of 400 cps to 700 cps, and arrives with a lapse of time between 10 to 30 seconds thereafter, at a viscosity where it stops flowing. The foaming polyurethane resin material should be adjusted for a match thereto, and is adjusted for a viscosity characteristic, where it is allowed, with a maintained layer state, to flow within the cavity C together with the material for skin layer formation.

The timing for injection of foaming polyurethane material, if selected when the viscosity of the material for skin layer formation has a viscosity below 400 cps, causes the two kinds of material to be mixed together, or the foaming polyurethane material to break through the material for skin layer formation and expose, thus failing to attain the objective of embodiment of the invention. Accordingly, it is injected when the viscosity of the material for skin layer formation has a viscosity within a range of 400 cps to 700 cps after injection. In this case, the viscosity rise is not so steep as to need a high precision of injection timing, and a layered skin can be obtained, sufficiently as desired, even if the injection of foaming polyurethane is started by a typical relay timer well used the injection facility. Therefore, the facility cost does not constitute a bottleneck to implement an embodiment of the invention, nor the management of manufacture process has no particular difficulties, allowing for an extreme applicability to mass production.

The foaming polyurethane material should be adjusted for a foaming to be continued till the material for skin layer formation reaches a viscosity within a range of 800 cps to 1,000 cps. If the foaming ends before this viscosity range is reached, the skin layer can reach only so far as not very distant from a gate G, and becomes thick about the gate G. On the other hand, if the foaming continues still after the viscosity of the material for skin layer formation has exceeded 1,000 cps, the foaming polyurethane material may overflow in large quantities from gas vent holes at distal ends of the flow, being lost together with the material for skin layer formation from the gas vent holes, causing the skin layer to be reduced in thickness, along with reduction in density of the foaming polyurethane material.

Such being the case, the viscosity characteristic should be adjusted in correspondence to a necessary flow distance, and may be fine adjusted in accordance with the configuration of product, rage of skin attachment, thickness of skin layer, and density of foaming polyurethane to be selected, and furthermore, an aimed tactile impression as well as airbag cleavability, etc.

For end parts of mold goods to be covered in the thickness direction as well by the resin material for skin layer formation, simply the resin material for skin layer formation may preferably be first injected by a small quantity. Further, to obtain a mold goods likewise covered at gate G side end parts as well by the resin material for skin layer formation, simply the resin material for skin layer formation may preferably be finally injected by a small quantity.

In embodiments of the invention, thus obtained laminate mold goods may preferably have a controlled ratio between material of skin layer and material of foamed layer, for a skin layer thickness within a range of 0.3 mm to 2.0 mm, and a foamed layer thickness within a range of 1 mm to 15 mm, and within a range of about 13 mm to 17 mm (max) as an entirety of skin, while the range within 1 mm to 15 mm can be usually implemented in a stable manner and is useful for application to product, this range allowing for a flexible adjustment.

In embodiments of the invention, the skin of laminate mold goods has its layers individually clearly formed to a visually discriminable extent, so long as a cut face is observed. However, the interface between skin layer and foamed layer, as well as that between non-foamed layer and foamed layer in a three-layer structure, is reactive in the mold in a concurrently advancing manner, this forming a lamination with a tight attachment to be strong to an extent where it is unseparable with ease, due to a chemical bond of polyol and polyisocyanate between mutually neighboring layers.

Therefore, even in a try to peel off the skin, e.g. skin layer, from the foamed layer along the boundary, it is unseparable at the boundary, and the foamed layer may be internally divided (torn). The adhesion strength at the interface prevails over strength of the foamed layer itself, and provides a level of strength to be free of interlayer separation.

In particular, in the three-layer structure, an intervenient non-foamed thin-film layer between the base member 2 and a foamed layer provides a secured tight attachment between base member 2 and foamed layer, allowing a strong fixation of skin to be implemented with ease. In an exemplary case in which a polypropylene resin or the like is used for base member 2, a skin can be joined strong to the base member 2, by giving a flame process, corona process, plasma process, or the like to a surface one the side of base member 2 for the skin to be attached, or by use of a variety of primer or adhesive that raises the affinity with polyurethane. Such a process and primer may be employed in combination in an adequate manner for joint with an increased strength.

This joint strength is important among others, to obtain a function as a cover to form a lid for airbag. For formation of a lid for airbag, it is important for a skin of two-layer structure to have a uniformity in the thickness of skin layer and foamed layer, as well as for skin of three-layer structure to have a uniformity in the thickness of skin layer, foamed layer, and non-foamed layer. If voids reside on or near a presumptive line for breakage to form a lid or a presumptive line for hinge, the break property might be different between a place present of voids and a place absent of voids, and such a situation state be avoided. Further, if the lid portion is uneven in thickness of layers between a part thereof and another, it might be difficult to obtain desirable cleavage and rotation characteristics. The skin layer and the foamed layer, and additionally the non-foamed layer have thickness relationships in between, which might be influenced by, as they are sensitive to, a configuration of the base member 2 for a desirable airbag deployment, with a resultant great variation, which might cancel an effect of improvement of the base member 2 or render the improvement pointless, and should be avoided.

Embodiments of the invention are free of sensitive influences from cancavo-convex of base member 2, and have a uniformity held free from great variations in thickness relationships of layers between before and after concavo-convex in the flow direction. Therefore, the skin on presumptive lines for breakage has a stable quality and characteristic, and is cleavable on or along the presumptive lines for breakage. Generally, the lid for airbag deployment takes a double flap system by presumptive lines shaping an H form, or a single flap system by presumptive lines shaping a U form. Further, in the case of a (so-called seamless instrument) system in which a lid is cut off along the whole circumference and the lid and a remaining part of cover is interconnected by a hinge structure as a separate part, presumptive lines for the double flap system shape the form of "日" (pronounce: hi) as a Kanji character (like a B, or a H with a top bar interconnecting upper ends of side stems thereof and a bottom bar interconnecting lower ends of the side stems: referred to as "B"), and presumptive lines for the single flap system shape to the form of "ロ" (pronounce: ro) as a Japanese Katakana letter (like a lying D, or a U with a top bar interconnecting upper ends of side arms thereof: referred herein to as "D"). In any of illustrated cleave shapes "H", "U", "B", and "D", there is a great change of direction in progress of breakage to develop at a corner in between two lines as sides neighboring each other.

In the case of "H" or "B", the central cross line has intersections with both left and side side lines, in a T form, where a great upward force acts upon airbag deployment, causing the cover to instantaneously deform in a rising manner. A very great shearing force acts between the T intersection and a neighboring peripheral part of cover, having great stresses imposed between layers constituting the skin. Interlayer separation adversely affects a stable formation of the lid, and should be avoided. For an entirety of skin, concurrent formation of the skin layer and the cushion layer, allows components of materials forming them to react in parallel, mutually bonding along the boundary surface, achieving tight attachment between layers, and contribute to provision of desirable lid configuration.

That is, the interlayer separation in a surface direction of the panel in shearing is suppressed, allowing the more concentration of stress to cleavage in the thickness direction. Therefore, typically, the skin is cut just above presumptive liens for breakage of base member 2, faithfully along the breakage presumptive lines. Although T intersections or the like may be somewhat deviated outwards from right-above positions, even in such a case, if for example both left and right side lines are straight, there are formed sculpturesque straight-linear break lines shifted outwards in parallel with the left and right lines. The surface at the skin side of base member 2 may be a simple plane, but may preferably be provided with low ribs along presumptive lines for breakage, allowing a secured control of break direction of the skin. The low ribs may be as low as 1 mm or less, for example 0.5 mm, in consideration of no influences on skin formation.

The skin layer may be given an adequate shrink as fine concavo-convex on the surface. The shrink may be leather shrink imitating leather as a typical shrink for automobile interiors, but may be a variety of shrink without limitations thereto. The shrink may be a random pattern, and further may employ an ultra-fine mat finish (matte, backskin fashion), a regular array of semi-spherical fine projections or recesses (dimple, etc), giving a soft appearance, or effects such as suppression of luster for prevention of reception of a image on a windshield by reflection of outside light.

The base member 2 may be a rigid resin such as thermoplastic resin (polypropylene resin, ABS resin, styrene maleimide resin (SMA), modified polyphenylene oxide resin (m-PPO), etc.), a flexible resin such as thermoplastic elastomer resin (olefin system elastomer (TPE), urethane system elastomer (TPU), etc.) or a combination such as by double color molding of such rigid and flexible reins, and may have a weak portion (breakage presumptive groove, tear line) formed for facile breakage under pressure of a deployed airbag, by providing score lines such as by a laser beam cutter, ultrasonic cutter, hot edge machining tool, or NC mill, to a surface at the side to be given no skin. In the case of an allowed intrusion of urethane material of skin, score lines may be given by a method described, simply to the side to be given a skin, or to both front and back sides. Typically, score lines to be selected may be as shallow as about 1 mm, may not be deep in any way, as they have no substantial influences on skin formation. They may be different in depth as well as in width, and may be shallow at the front side and deep at the back side, or such.

A configuration of groove may be integrally molded, by using a stationary mold configuration or a retractable mold mechanism, when molding base member 2. In this case, due to difference in shrinkage of volume in the mold, the surface of base member 2 may be different in luster, or have shrinkage lines (sink lines), which however do not constitute a final design quality as a single body of base member 2, and are hidden by coverage of a skin integrally molded thereafter, thus constituting no problems with respect to the design. Like score lines by the cutter or such, a configuration of groove may be provided on the front side, in a voluntary manner of setting, with a limitation to be free of problems due to intrusion of skin materials into the grove configuration, and groove configurations may be provided at both front and back sides, as they are hidden by skin, thus constituting no problems of appearance.

In embodiments of the invention, the polyurethane resin material for skin layer formation may particularly be a non-yellow-coloration type of polyurethane, for a required light resistance characteristic (light resistance specification) of product to be met without applying a barrier coater (masking film-coat forming material). An unnecessary in-mold coating enables omission of a process for removing from mold goods a barrier coat film coated on a mating surface of mold, allowing for a reduced production cost, with suppression of consumption of a solvent for coating use and of occurrences of scrapes, which are excellent in environmental load reduction, as well. For the foaming material, rays of light such as ultraviolet ray are then shielded by the polyurethane resin material for skin layer formation, and kept from reaching the inside, thus allowing the use of a typical type of polyurethane resin material without provision of countermeasures to yellow coloration.

Hardness may also be increased by selection of kind of the polyurethane resin material for skin layer formation, to provide a lightweight and rigid panel, which may be given a pattern such as woody grain, to thereby provide a panel with a texture similar to natural wood. This may be given a function as a cover for coverage of an airbag device, in consideration of cleavage of the woody grain panel itself for such appearance of air bag that is usually unexpected by a passenger, which thus allows configuration of an instrument panel with a merit that passenger is quite free of feelings about presence of the airbag device. A cork board fashion of woody grain pattern is an example of wooden texture panel employable for an effective use of characteristics of a mold goods according to an embodiment of the invention.

There will be described below examples of product applications of embodiments of the invention, with reference made to the drawings.

Figure 1:
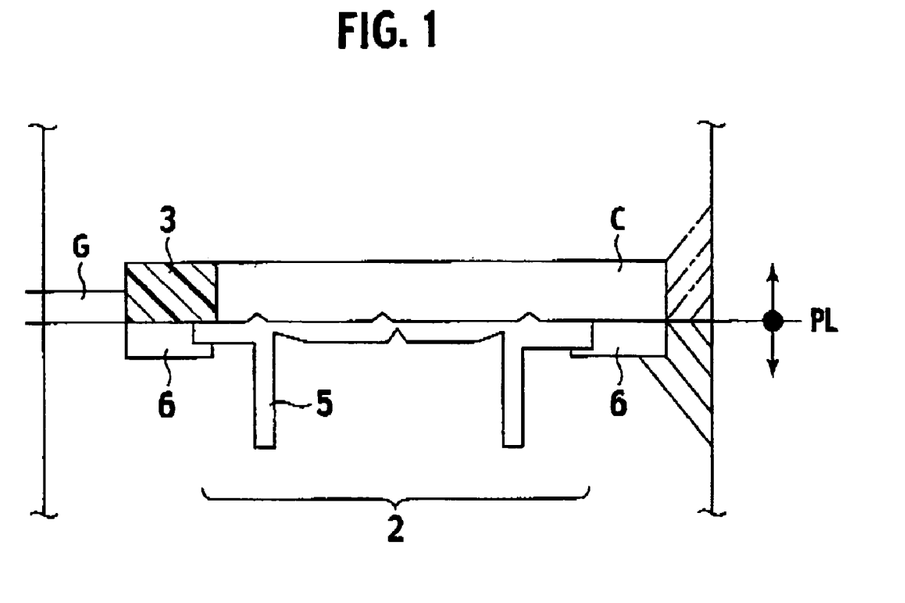
FIG. 1 illustrates an embodiment in a state in which a resin material for formation of a non-foamed skin layer is injected in a cavity.
Figure 2:
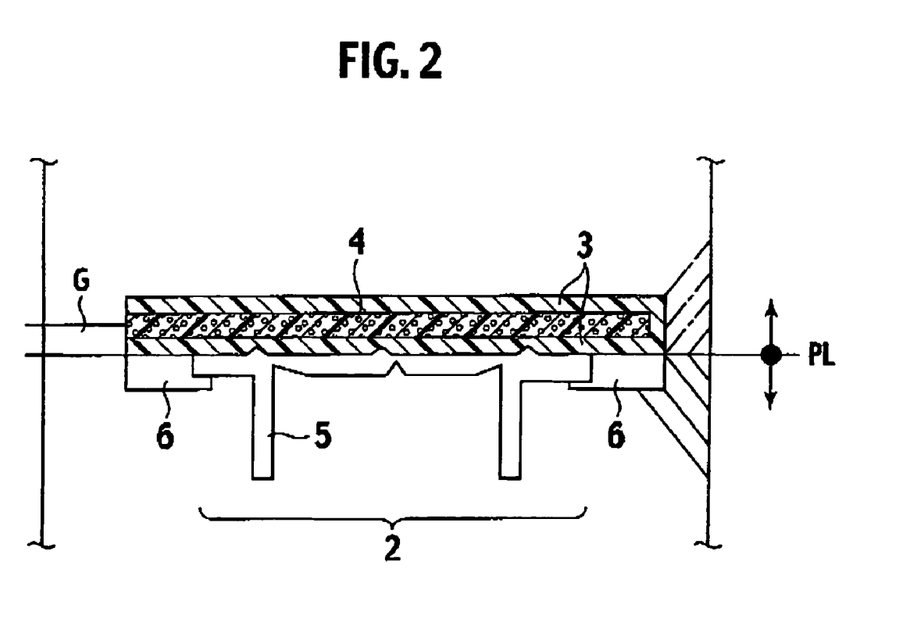
FIG. 2 illustrates a state after the injection of the resin material for formation of the skin layer, in which a resin material for formation of a foamed layer is injected and foamed in the cavity.

FIGS. 1 and 2 illustrate a manufacturing method of a laminate mold goods (as an airbag integrated instrument panel referred herein to as "airbag cover panel") according to an embodiment of the invention. Designated by reference character C is a mold cavity, and 2 is a base member, which is a combination of an inner portion 5 configured for accommodation of an airbag, as an injection molding of a flexible resin, such as an olefin system elastomer resin (TPE), and a frame 6 made of a rigid resin, such as a polypropylene resin (PP), and integrally molded on an outer periphery of the inner portion 5, in advance, using a mold else, in a manner that a rigid resin portion is horizontally arranged about a flexible resin portion, in which a lid portion for airbag deployment is made flexible, and a peripheral thereof is configured with an increased rigidity, for effective suppression of deformation such as by an elbow put thereon. For the frame 6 of base member, a rigid resin (for example, PP resin, a PP resin with a filler such as talc added (PP composite (PPC)), ABS resin, modified PPO resin (m-PPO), or nylon 66) may be used, and for the inner portion 5, a flexible resin (for example, olefin system elastomer (TPE), urethane system elastomer (TPU), styrene system elastomer (SEBS), polyester system elastomer (TPEE), etc.) may be used. The configuration may be a combination of a base member molded with a rigid resin, and a support member molded with a flexible resin described or the like and deposited in a superposed fashion onto a back side of the base member, in a manner that a rigid resin portion is vertically arranged on a flexible resin portion. Or alternately, there may be used press-cut thin plates such as duraluminum or steel, or a adequate combination thereof, for example, a combination of a steel plate cut in a simple shape and provided with a portion of somewhat complex shape, as it is integrated therewith by an insert injection molding of PPC, or the like. A resin laminate steel sheet may be used, to be cut out as a base member, to make use of the affinity between laminate resin surface and skin, for an enhanced adhesion strength.

Designated by reference character 3 is a non-foaming polyurethane resin material, and 4 is a foaming polyurethane resin material. The base member 2 is disposed in the mold cavity C, and the mold is closed. In the mold cavity C, as shown in FIG. 1, non-foaming polyurethane resin material 3 is injected, as it is composed of a glycol system cross-linker, polyol of an average molecular weight within a range of 4000 to 6000 or near, and aromatic polyisocyanate containing 90% or more in proportion of trimer and greater multimers, and adjusted for a gel time within a range of 30 to 40 seconds. This resin material has an increasing viscosity, as a reaction advances, and reaches 600 cps with a lapse of 6 seconds, when the foaming polyurethane resin material is injected, as it is composed of a glycol system cross-linker, polyol containing a foaming agent of carbon dioxide and formic acid, and having an average molecular weight within a range of 5000 to 7000 or near, and aromatic polyisocyanate containing 5% or less in proportion of trimer and greater multimers, and adjusted for a clear time of 10 seconds, and a rise time within a range of 30 to 40 seconds.

When injected, the foaming polyurethane resin material has a viscosity of 300 cps. For foaming polyurethane, gas such as carbon dioxide is blown, by a direct blow or the like, into a polyol tank, third component tank, or piping. For mixing a chemical foaming agent, it may be better mixed by input to polyol tank or third component tank, and needs an adequate selection. By doing so, it becomes unnecessary to reduce pressure of material supply line, to increase the viscosity of non-foaming polyurethane material to a viscosity, where this is kept from mixing with foaming polyurethane, upon the injection into cavity, to take into consideration a pressure variation upon injection of high-viscous material, nor to count a subtle injection timing of foaming polyurethane material. Therefore, there is required no severe process management, thus allowing for a stable industrial production.

By this injection of resin material, as shown in FIG. 2, over an entire inside of the cavity C, the foaming polyurethane resin material is put so as to be wrapped inside the non-foaming polyurethane resin material, and in a three-layered state, filled and foamed. The foaming is substantially completed till the viscosity of non-foaming polyurethane resin material reaches a viscosity range of 800 cps to 1000 cps. Then, this state is held till the reaction ends, and thereafter, the mold is opened for removal of laminate mold goods.

The airbag cover panel as a laminate mold goods thus obtained has a skin 7 that has formed, on the base member, a non-foamed polyurethane resin layer with a film thickness of 0.5 mm, a foamed polyurethane resin layer with a thickness of 3.0 mm, and a non-foamed polyurethane skin layer with a film thickness of 0.5 mm. Those resin layers are substantially uniform in thickness over a wide range covering whole points where a lid portion is formed for deployment of airbag, and the foamed layer is free from defects such as voids, and the foamed state also is uniform.

Like this, a non-foamed polyurethane resin layer is formed under a foamed layer, which is put under a skin layer, whereby the tactile impression when the surface is pressed by a finger is kept, by reaction forces of the non-foamed polyurethane layer, from getting bottom-striking that otherwise might be felt on the base member just after the foamed polyurethane resin intermediate layer is pushed down, whereby the rigid feeling of base member is moderated, to provide a preferable tactile feeling.

Description is now made of a molding method according to another embodiment. Under a normal pressure, a non-foaming polyurethane resin material for skin layer formation is injected inside the mold cavity, and immediately thereafter, a foaming polyurethane resin material for cushion layer formation is injected, as it prepared by mixing a foaming agent as a combination of foaming agents having two kinds of foaming characteristics. This combination of foaming agents include one (fast-acting foaming agent) that has a characteristic to start foaming immediately after injection, and one (persisting foaming agent) that has a characteristic to seldom start foaming immediately after injection and to start foaming after a lapse of a prescribed time.

As the fast-acting foaming agent to be used, there is, for example, carbon dioxide adsorbing amine to be brought into contact with isocyanate to thereby immediately release a gas, carbon dioxide to be blown to and dissolved in polyol in a storage tank, or chlorofluorocarbon or pentane for thermal evaporation foaming. As the persisting foaming agent to be used, there is a combination of water, and one kind or two or more kinds of acid such as formic acid.

EMBODIMENT EXAMPLES

Example 1

Description is now made of an example of molding of an airbag cover panel.

As materials for skin formation, a material for skin layer formation and a material for cushion layer formation were prepared. For the material for skin layer formation, there were prepared polyol having respectively mixed a cross-linker as a 1:1 mixture of an amine system cross-linker and glycol system cross-linker and a catalyst as a combination of a metallic catalyst and an amine system catalyst, having an average molecular weight within a range of 4000 to 6000 or near, and aromatic isocyanate of a crude type containing 90% or more in proportion of trimer and higher multimers, and adjusted for a tack-free time (necessary time for curing) to be within a range of 20 to 30 seconds when mixing. The supply system (first RIM machine) of this material for skin layer generally had a tank for isocyanate, a tank for polyol, a tank for pigment (coloring agent), an injection head, feed lines for interconnection between the tanks and the injection head, and liquid feeders.

That is, die pigment was prepared in a separate tank relative to the tank for polyol and the tank for isocyanate, and separate feed lines, three in total, were connected to the injection head (a head of three-liquid mixing type), where respective liquids supplied from those three systems were mixed at a time. For the material for cushion layer, there were prepared polyol having added 5% by weight and 0.3% by weight of glycol system cross-linker and catalyst, respectively, having an average molecular weight within a range of 5000 to 7000 or near, and aromatic isocyanate (as a modified type of pure MDI) having, as foaming agent, formic acid added, and carbon dioxide dissolved, and having 5% or less in proportion of trimer and higher multimers, and adjusted for a cream time (foaming start time after mixing) to be 0 second when mixing, and a rise time (foaming stop time after mixing) within 20 to 30 seconds.

The supply system (second RIM machine) of this material for cushion layer generally had a tank for isocyanate, a tank for polyol, feed lines for interconnection between the tanks and an injection head (a head of two-liquid mixing type), and liquid feeders. No coloring agent is added to the material for cushion layer. The two RIM machines were controlled, integrally with a mold opening-closing apparatus, from a central controller. The injection heads of the RIM machines were each respectively mounted to an airbag cover panel molding mold. The two injection heads were each respectively connected to one of introduction ports of runners, and downstream the introduction ports, the two systems joined together, to be connected as a single path to an injection gate G of the mold cavity.

For the airbag cover panel, a base member was molded by injecting a polypropyrene resin, whereto the mold cavity had a space set for a distance (4 mm) to be substantially constant. The gate G was a fan gate 1.5 mm thick. The base member was substantially simple-planer, with a substantially constant plate thickness of approx. 3 mm, excepting for grove parts formed upon the injection molding, as well as for bosses for deposition to a support (inner structure) to be joined to a structural member of an instrument as well as to a reaction can of an airbag device. The mold cavity had a space for insertion of the base member, i.e., a space for skin formation, which was set for a substantially constant 1 mm.

The material for skin formation was given a viscosity vs. time characteristic, where it had 100 cps as an initial (upon injection to the mold cavity), 600 cps at 6 seconds, 800 cps at 15 seconds, and 1000 cps at 20 seconds (upon finish of molding), as being soaring.

Figure 6:
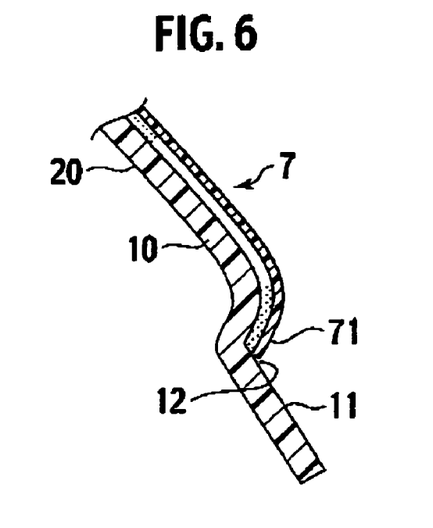
FIG. 6 illustrates an embodiment of an air bag cover panel as a section along line VI-VI of FIG. 7.

FIG. 6 illustrates an airbag cover panel in which a skin according to this embodiment was partially attached on a base member 20. An attached portion 10 was swollen out, having a termination 71 of skin 7 located on a non-attached portion 11 on the base member 20. The skin was extended around to a corner, where it had a defined termination located on an edge line 12. A non-attached portion 11 may serve for another member, for example, a neighboring finisher (air outlet's frame panel, cluster lid, etc.) of instrument panel may directly abut on the base member 20, whereby this can be position. At this termination also, the skin and base member have high adhesion strength, and are kept from problems, such as a separation that otherwise might have been caused when caught by an edge of the finisher during a handling in a vehicle assembly process.

Figure 7:
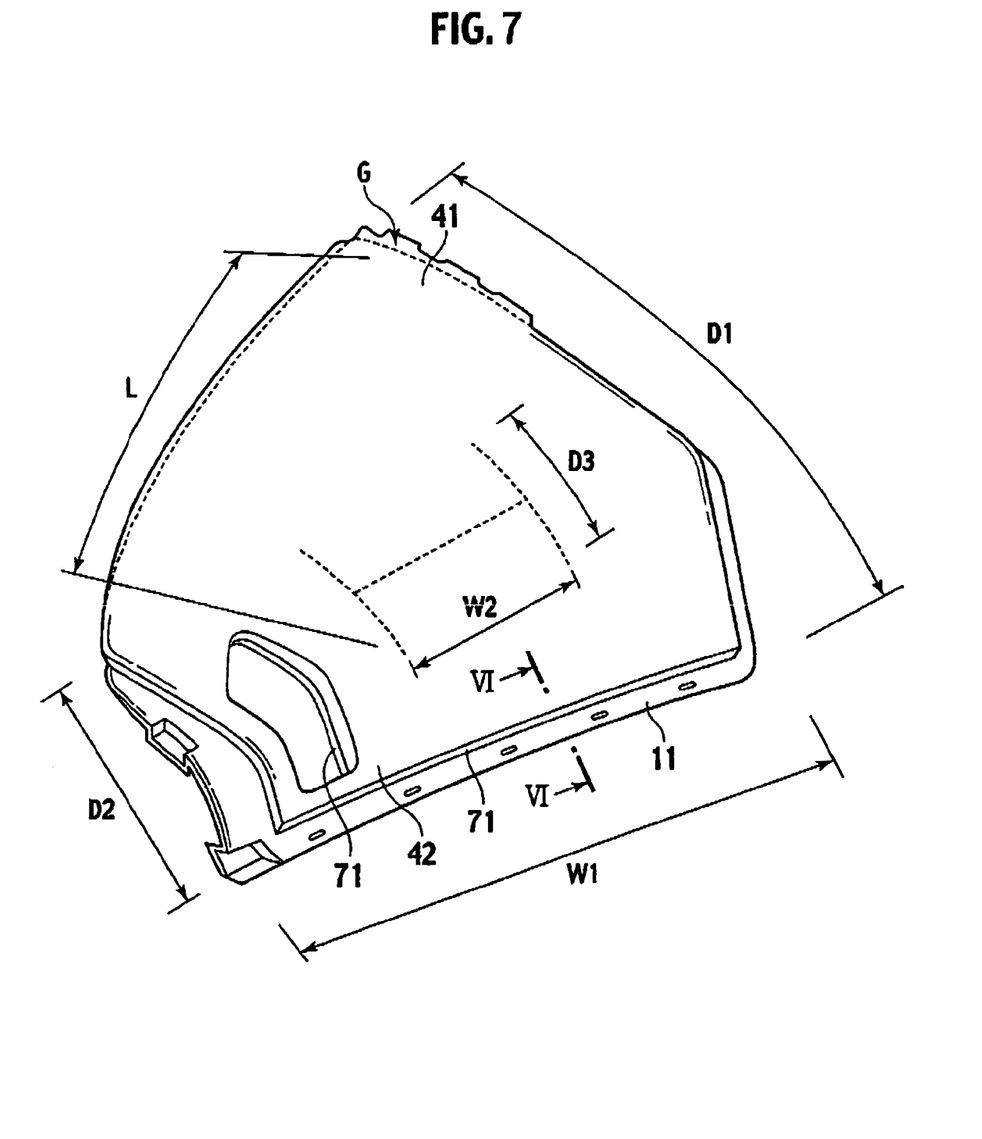
FIG. 7 illustrates an appearance of the air bag cover panel of FIG. 6.

The airbag cover panel was substantially trapezoidal as illustrated in FIG. 7, and approximately had a transverse dimension W of 450 mm, and longitudinal dimensions of 500 mm (along long side D1) and 250 mm (along short side D2). A lid for airbag deployment was provided, which was an H type with a rectangular size of a length D3 of 120 mm by a breadth W2 of 230 mm, and located at a distance L of 350 mm from a position of a gate G at a termination on a rear side of vehicle to a rear end of the lid, while the skin was substantially uniform in thickness over an entirety of the panel, including a region of the lid for airbag deployment. It had at an immediately vicinal portion 41 to the gate G a top layer 0.2 mm thick, an intermediate layer 3.5 mm thick, and a bottom layer 0.3 mm thick, and at a farthest portion 42 from the gate G a top layer 0.8 mm thick, an intermediate layer 2.5 mm thick, and a bottom layer 0.7 mm thick, thus remaining within a difference of 1 mm as a thickness of cushion layer at a distance of 500 mm, proving a stability of layer thickness. Further, upon deployment of airbag, the vleavage line also and a smooth form extending faithfully along a presumptive cleavage groove of the base member.

Example 2

There will be described a molding of a steering wheel according to another embodiment example. Description is made of a distinctive feature over the foregoing example 1, omitting like points to the above-noted example.

As materials for skin formation, a material for skin layer formation and a material for cushion layer formation were prepared. For the material for skin layer formation, there were employed, relative to the above-noted example, like polyol, and aliphatic isocyanate, as a non-yellow coloration type adjusted for a tack-free time (necessary time for curing) to be within a range of 20 to 30 seconds when mixing.

For the material for cushion layer, there were employed polyol having added ethylene glycol as a cross-linker and TEDA as a catalyst, having an average molecular weight within a range of 5000 to 7000 or near, and aromatic polyisocyanate (as a modified type of pure MDI) having, as foaming agent, formic acid added, and carbon dioxide dissolved, and having 5% or less in proportion of trimer and higher multimers, and adjusted for a cream time (foarming start time after mixing) to be 0 second when mixing, and a rise time (foaming stop time after mixing) within 20 to 30 seconds.

FIG. 8 illustrates a steering wheel 50 according to the embodiment example. The steering wheel 50 was configured with a ring portion 58 in the form of an annulus, and a spoke portion 59 extended from the ring portion 58 toward the center of annulus, and had as a base member 54 thereof a diecast-molded frame member of magnesium alloy, called "core bar". The material for skin formation was given a viscosity vs. time characteristic, where it had 100 cps as an initial (upon injection to the mold cavity), 600 cps at 6 seconds, 800 cps at 15 seconds, and 1000 cps at 20 seconds (upon finish of molding), as being soaring.

The steering wheel 50 of this example had a top layer 55 of a thickness of 0.3 mm, an intermediate layer of a thickness of 4.4 mm, and a bottom layer of a thickness of 0.3 mm at an immediately vicinal portion 51 to a gate G, and at a farthest portion 52 from the gate G a top layer 1.0 mm thick, an intermediate layer 3.0 mm thick, and a bottom layer 1.0 mm thick, proving a uniformity of layer thickness. Further, also a connection 53 between the spoke portion and the ring portion was smooth, constituting no problems of appearance even when a thinned line of the skin was set upside in front view.

Figure 9:
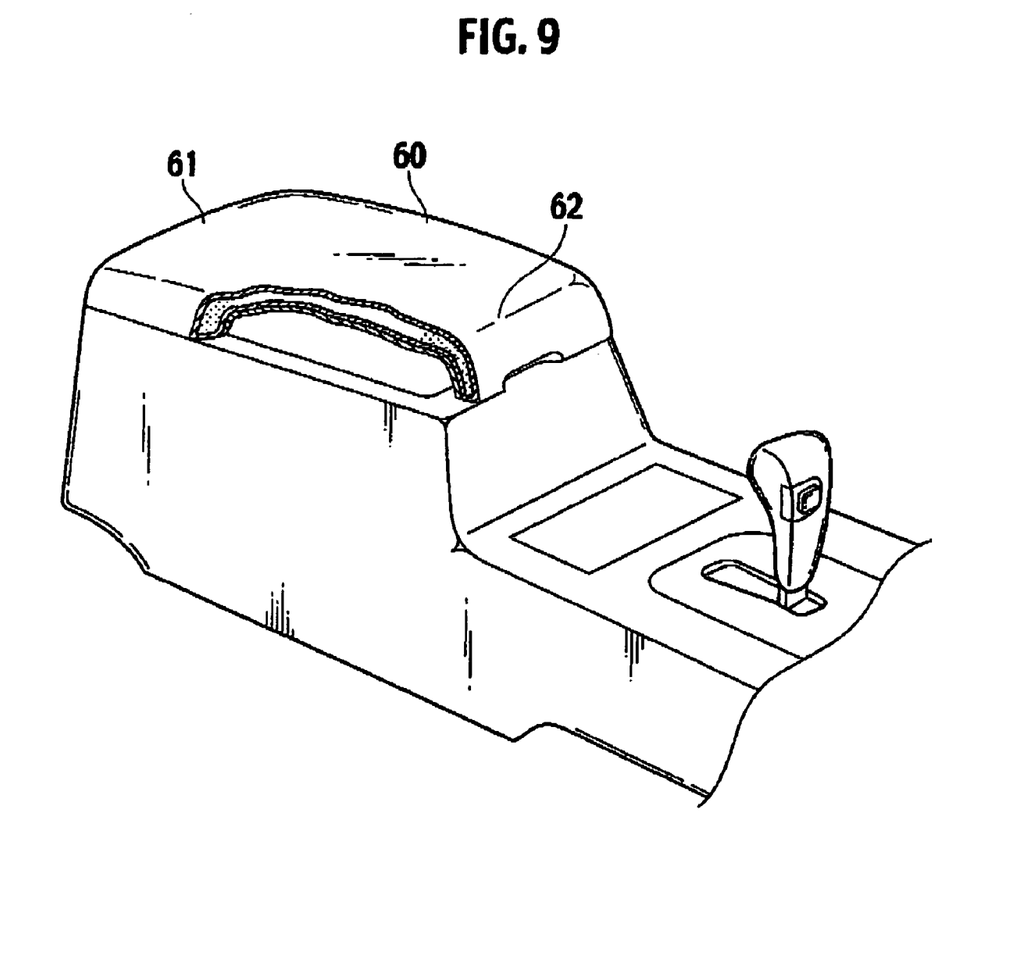
FIG. 9 illustrates an embodiment of a console lid concurrently serving as an arm rest.

FIG. 9 is a perspective view, partly in section, of a center console with a lid using polyurethane materials of the example 2. The lid 60 concurrently functions as an arm rest, and needs a cushion property and restorability. The lid was 350 mm in total length, and had a gate G at a location to be rear when vehicle-mounted. It had at an immediately vicinal portion 61 to the gate G a top layer 0.5 mm thick, an intermediate layer 7.0 mm thick, and a bottom layer 0.6 mm thick, and at a farthest portion 62 from the gate G a top layer 0.9 mm thick, an intermediate layer 6.3 mm thick, and a bottom layer 0.9 mm thick. A prompt restoration was observed, after such a typical loading as putting an elbow.

As will be seen from the foregoing description, according to the present invention, in a mold goods as a laminate having on a base member a skin layer composed of a foamed polyurethane resin cushion layer, and a non-foamed polyurethane skin layer, or in a mold goods as a laminate having a skin layer composed of a non-foamed polyurethane resin thin-film layer (as a bottom layer), a foamed polyurethane resin intermediate cushion layer (as a mid layer), and a non-foamed layer polyurethane skin layer (as a top layer), the mold goods can be implemented with an enhanced uniformity, such as in thickness of each layer as well as foaming of foamed layer, over an appreciably wide range thereof. Further, according to the invention, an insert molding method allows a mold goods as a laminate of layers with an enhanced uniformity to be manufactured in a single process, under a normal (atmospheric) pressure, with a good productivity at low cost.

The present invention is applicable for example to instrument panel lower panels (dashboard lower panels), in particular to knee air bag oriented, panel-shaped members, such as an air bag cover panel, scuffing plate (kicking plate), pillar garnish (rear pillar garnish, center pillar garnish, etc.), sun visor, seat back cover, console box (center console, roof console, etc.) finisher, glove box outer panel, as well as to a steering wheel, in addition to grip members such as control knob and assist grip.

The contents of Japanese Patent Application No. 2005-377471, filed on Dec. 28, 2005, are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. An insert molding method for molding an integrated skin and foam article in a single process for an article of manufacture comprising:
    placing a mold on a base member to be used as a part of a molded article of manufacture to form a closed mold cavity;
    injecting a reaction molding non-foaming polyurethane resin into the closed mold cavity along a surface of the base member under atmospheric pressure; and
    subsequently initiating injection of a reaction molding foaming polyurethane resin into the closed mold cavity along the surface of the base member under atmospheric pressure when a viscosity of the non-foaming polyurethane resin is between 400 cps and 700 cps;
    wherein upon injection of the non-foaming and foaming polyurethane resins into the closed mold cavity, the non-foaming polyurethane resin forms a non-foamed skin layer and the foaming polyurethane resin forms a foamed layer, opposed surfaces of the non-foamed skin layer and the foamed layer integrally connecting and fusing with one another to form a flexible layer, the flexible layer substantially uniform along the base member from an injection point to a point on the base member distant from the injection point; and,
    wherein the base member is a structural supporting member.

2. The insert molding method as claimed in claim 1, wherein the foaming polyurethane resin and the non-foaming polyurethane resin are concurrently flowed inside the mold cavity and along the base member under an atmospheric pressure, whereby the non-foaming and foaming polyurethane resins are filled in the mold cavity concurrently upon a substantial completion of foaming.

3. An insert molding method for molding an integrated skin and foam article in a single process for an article of manufacture comprising:
    placing a mold on a base member to be used as a part of a molded article of manufacture to form a closed mold cavity;
    injecting a reaction-molding non-foaming polyurethane resin into the closed mold cavity and along a surface of the base member under atmospheric pressure; and
    injecting a reaction-molding foaming polyurethane resin into the closed mold cavity immediately after the injection of the non-foaming polyurethane resin, to integrally form a flexible layer,
    wherein the foaming polyurethane resin comprises:
    a first foaming agent initiating foaming of the foaming polyurethane resin immediately after the injection of the foaming polyurethane resin into the closed mold cavity;
    a second foaming agent initiating foaming of the foaming polyurethane resin at a predetermined time after the initiation of foaming of the first foaming agent;
    wherein the flexible layer has an integral and uniform layer formed along a surface of the base member from an injection point of both the non-foaming polyurethane resin and the foaming polyurethane resin to a point distant therefrom; and,
    wherein the base member is a structural supporting member.

4. The insert molding method as claimed in claim 3, wherein the reaction-molding material of the foaming polyurethane resin and the non-foaming polyurethane resin having a viscosity within a range of 400 cps to 700 cps are concurrently flowed inside the mold cavity and along the base member under an atmospheric pressure, whereby the foaming and non-foaming polyurethane resins are filled in the mold cavity concurrently upon a substantial completion of foaming.

5. The insert molding method as claimed in claim 1, wherein injection of the reaction molding foaming polyurethane resin into the mold cavity is initiated when a viscosity of the non-foaming polyurethane resin is within a range of 600 cps to 700 cps.

6. The insert molding method as claimed in claim 1, wherein injection of the reaction molding foaming polyurethane resin into the mold cavity is initiated when a viscosity of the non-foaming polyurethane resin is within a range of 650 cps to 700 cps.

7. The insert molding method as claimed in claim 1, wherein the foaming polyurethane resin is injected into the mold cavity when its viscosity is within a range of 100 cps to 400 cps.

8. The insert molding method as claimed in claim 1, wherein the foaming of the foaming polyurethane resin in the mold cavity continues until the viscosity of the non-foaming polyurethane resin rises to about 800 cps.

9. The insert molding method as claimed in claim 3, wherein the first foaming agent is selected from carbon dioxide adsorbing amine to be brought into contact with isocyanate to thereby immediately release a gas, carbon dioxide to be blown to and dissolved in polyol, and chlorofluorocarbon or pentane for thermal evaporation foaming, and the second foaming agent is a combination of water, and one kind or two or more kinds of acid.

10. The insert molding method as claimed in claim 1, wherein the base member is encased in the flexible layer.

11. The insert molding method as claimed in claim 3, wherein the base member is encased in the flexible layer.

12. The insert molding method as claimed in claim 1, wherein the non-foamed skin layer is fixed to the article of manufacture via the base member.

13. The insert molding method as claimed in claim 3, wherein the flexible layer is fixed to the article of manufacture via the base member.

14. The insert molding method of claim 1, wherein after initiating injection of the foamed polyurethane resin, the foamed layer is disposed between the base member and the non-foamed skin layer.

15. The insert molding method of claim 3, wherein after initiating injection of the foamed polyurethane resin, the foamed layer is disposed between the base member and the non-foamed skin layer.

16. The insert molding method of claim 1, wherein the base member supports the foamed layer and the non-foamed skin layer.

17. The insert molding method of claim 3, wherein the base member supports the foamed layer and the non-foamed skin layer.

18. The insert molding method of claim 16, wherein the base member is rigid relative to the foamed layer and non-foamed skin layer.

19. The insert molding method of claim 17, wherein the base member is rigid relative to the foamed layer and non-foamed skin layer.

* * * * *